United States Patent [19]

Paul et al.

[11] Patent Number: 4,973,201
[45] Date of Patent: Nov. 27, 1990

[54] METHOD FOR REMOVING SCALE AND RADIOACTIVE MATERIAL FROM EARTH

[75] Inventors: James M. Paul, DeSoto; Peggy M. Wilson, Dallas, both of Tex.

[73] Assignee: Mobil Oil Corporation, Fairfax, Va.

[21] Appl. No.: 490,886

[22] Filed: Mar. 9, 1990

[51] Int. Cl.5 .............................................. E02D 3/00
[52] U.S. Cl. ................................... 405/264; 166/311; 405/263; 405/128
[58] Field of Search ............... 405/128, 129, 258, 263, 405/264; 134/2, 3; 166/311, 312; 252/80, 82, 175, 180, 626

[56] References Cited

U.S. PATENT DOCUMENTS

| | | | |
|---|---|---|---|
| 2,877,848 | 3/1959 | Case | 166/42 |
| 3,660,287 | 5/1972 | Quattrini | 252/8.55 B |
| 3,908,387 | 9/1975 | Nakamura | 405/263 |
| 3,951,827 | 4/1976 | Burroughs et al. | 252/8.55 B |
| 4,190,462 | 2/1980 | DeJong et al. | 134/2 |
| 4,215,000 | 7/1980 | DeJong et al. | 252/8.55 B |
| 4,276,185 | 6/1981 | Martia | 252/87 |
| 4,288,333 | 9/1981 | van Zon et al. | 252/8.55 B |
| 4,465,402 | 8/1984 | Termeulen | 405/264 |
| 4,708,805 | 11/1987 | D'Muhala | 210/698 |
| 4,842,448 | 6/1989 | Koerner et al. | |

Primary Examiner—David H. Corbin
Attorney, Agent, or Firm—Alexander J. McKillop; Charles J. Speciale; Malcolm D. Keen

[57] ABSTRACT

Surface layers of the earth contaminated with precipitates of alkaline earth metal sulfates including radium sulfate derived from subterranean waters brought to the surface of the earth, are decontaminated using an aqueous chemical composition including a polyaminopolycarboxylic acid such as ETDA or DTPA in combination with a synergist, preferably oxalate or monocarboxylic acid anion such as salicylate. The surface layers may be decontaminated in situ by applying the solvent to the earth to bring the precipitates into dissolved form after which the dissolved precipitates are leached into lower layers of the earth by percolation with water. Alternatively, the earth may be removed from its original site and decontaminated in a tank or lined pond after which the decontaminated earth may be returned to its approximate original site.

20 Claims, 1 Drawing Sheet

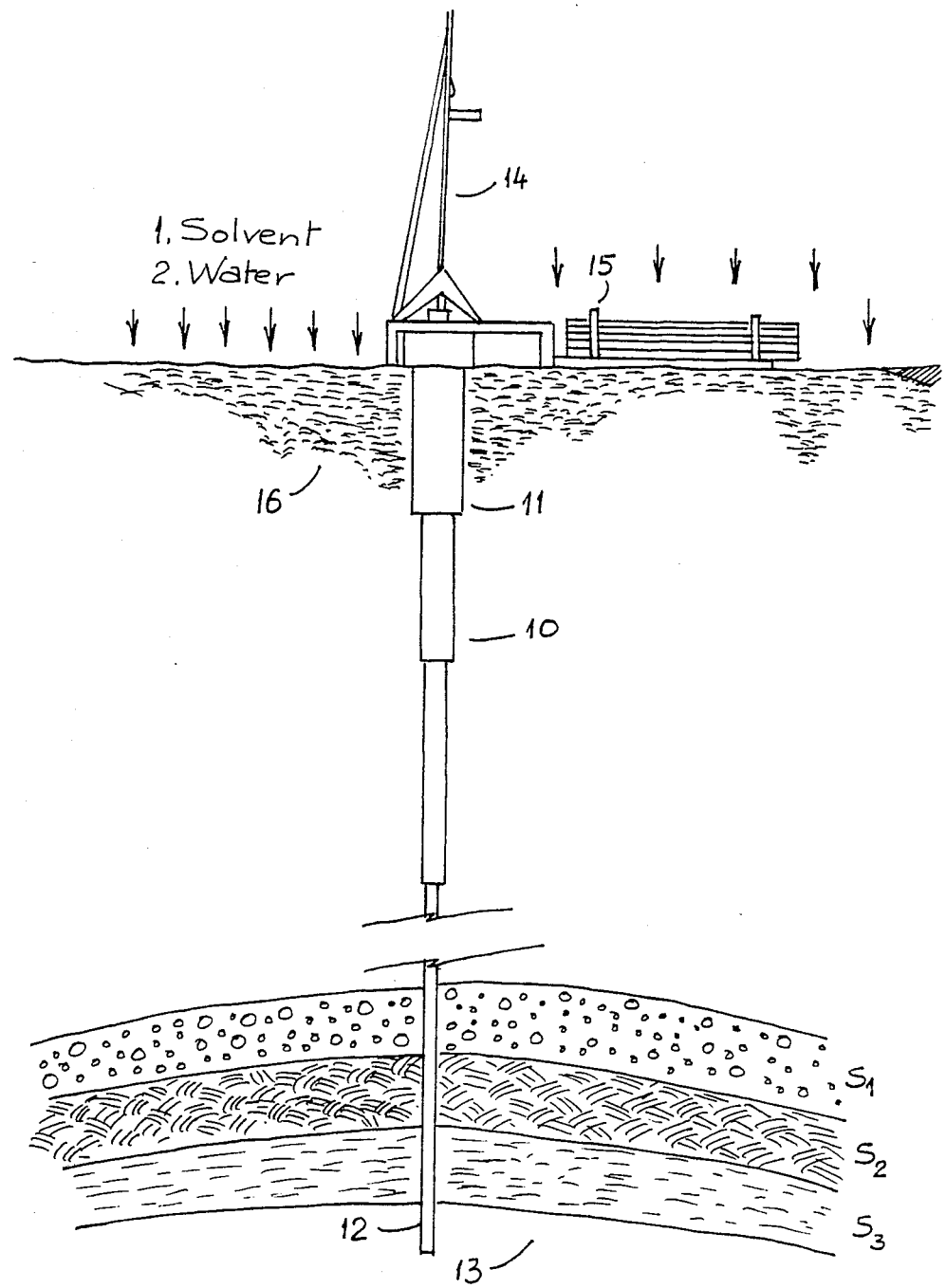

METHOD FOR REMOVING SCALE AND RADIOACTIVE MATERIAL FROM EARTH

CROSS REFERENCE TO RELATED APPLICATIONS

This application is related to the following co-pending patent applications:

| Serial No. | Filing Date |
|---|---|
| 07/332,146 | 04/03/89 |
| 07/369,897 | 06/22/89 |
| 07/431,114 | 11/03/89 |
| 07/484,970 | 02/26/90 |

These prior applications are directed to the use of various chemical compositions for the removal of alkaline earth scale deposits from oilfield equipment.

BACKGROUND OF THE INVENTION

Many subterranean waters contain alkaline earth metal cations, such as barium, strontium, calcium and magnesium, and anions, such as sulfate, bicarbonate, carbonate, phosphate, and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change in pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expensive problem in many industrial water systems, in production systems for oil and gas, in pulp and paper mill systems, and in other systems, causing delays and shutdowns for cleaning and removal.

Barium and strontium sulfate scale deposits present a unique and particularly intractable problem. Under most conditions, these sulfates are considerably less soluble in all solvents than any of the other commonly encountered scale-forming compounds, as shown by the comparative solubilities given in Table 1 below.

TABLE 1

| Comparative Solubilities, 25° C. in Water. | |
|---|---|
| Scale | Solubility, mg./l. |
| Gypsum | 2080.0 |
| Strontium sulfate | 140.0 |
| Calcium Carbonate | 14.0 |
| Barium sulfate | 2.3 |

It is generally acknowledged that barium sulfate scale is extremely difficult to remove chemically, especially within reasonably short periods of time: the solvents which have been found to work generally take a long time to reach an equilibrium concentration of dissolved barium sulfate, which itself is usually of a relatively low order. Consequently, barium sulfate must be removed mechanically or the equipment, e.g. pipes, etc., containing the deposit must be discarded.

The incidence of barium sulfate scale is worldwide, and it occurs principally in systems handling subsurface waters. Because of this, the barium sulfate scale problem is of particular concern to the petroleum industry as water is generally produced with petroleum and as time goes on, more petroleum is produced by the water-flooding method of secondary recovery, implying even greater volumes of produced water. The scale may occur in many different places, including production tubing, well bore perforations, the area near the well bore, gathering lines, meters, valves and in other production equipment. Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

Barium sulfate scale is particularly troublesome when sulphate-rich seawater is used as an injection fluid in oil wells whose formation water is rich in barium ions. This particular aspect of the barium scale problem is severe in some U.S. oil fields as well as some older North Sea oil fields. Scaling of this nature is also expected to occur during advanced production stages in other North Sea fields particularly after seawater breakthrough has taken place.

Another problem associated with the formation of barium and strontium sulfate scales is that radium, another member of the alkaline earth group of metals, tends to be deposited at the same time so that the equipment becomes radioactive, and may eventually have to become unusable for safety reasons alone. At present, a considerable amount of oilfield tubular goods are in this condition and cannot be readily restored to usable condition because of the difficulty of removing the radioactive scale.

As noted in Ser. No. 07/369,897, various proposals have been made in the past for the removal of barium sulfate scales using chemical scale removal compositions. Examples of such scale removal techniques are to be found in U.S. Pat. Nos. 2,877,848 (Case), 3,660,287 (Quattrini), 4,708,805 (D'Muhala) and U.S. Pat. Nos. 4,190,462; 4,215,000 and 4,288,333 (DeJong). The proposals set out in these dislosures represent, however, only partial or unsatisfactory solutions to the scale removal problem.

The related applications identified above disclose highly effective chemical scale removal compositions which may be used for removing alkaline earth sulfate scales from oil field equipment including tubular goods such as pipe, casing, and wellhead equipment such as meters, valves and above-ground piping. Reference is made to these copending applications for disclosures of these scale removal compositions and the methods by which they may be used.

Although, as described here, a principal problem area is with the deposition of these scale materials on oilfield equipment, there is a related problem which is that the earth around the equipment may become contaminated with these scale materials together with any associated radioactive components, if the subsurface waters are allowed to spill out onto the surface of the earth during normal operations. This may occur, for example, if subsurface waters are brought to the surface during drilling or production and stored in ponds from which they can seep into the surrounding earth layers. Another source of contamination of this kind is when attempts are made to remove scale from equipment by the use of various chemical scale removal solvents which are allowed to spill onto the surface of the earth and then to seep into it. In either case, the alkaline earth metal sulfates and any other potential scale-forming materials enter the earth layers near the surface and form insoluble precipitates in these layers of the earth. Because these precipitates may also contain radium, the earth formations into which the subterranean waters enter may be subject to contamination with these radioactive scale deposits when, as is usually the case, the conditions are appropriate for precipitation of the scale. In particular, if the subterranean waters are permitted to flood onto the surface of the earth, the surface earth and closely adjacent levels of the earth may become contaminated with the radioactive deposit and after a period of time may become undesirably radioactive, with a relatively high level of background radiation.

Clearly, it is desirable to return surface formations of the earth to a condition where background radiation is reduced to a low level and also to remove insoluble materials such as alkaline earth metal scales which may have been deposited by invasion of top surface waters. The present invention provides an effective means for this to be done.

SUMMARY OF THE INVENTION

According to the present invention, deposits of water insoluble alkaline earth metal sulfates including radioactive contaminants such as radium sulfate, are removed from the earth by the use of a chemical composition which includes a chelant (chelating agent) in combination with a catalyst or synergist which increases the solubility of the alkaline earth metal sulfates in aqueous solution. The preferred catalyst or synergist is the oxalate anion as described in Ser. No. 07/369,897, but other synergists may also be used including the monocarboxylate synergists as described in Ser. No. 07/431,114 and the thiosulfate or nitriloacetic acid synergists disclosed in Ser. No. 07/484,970.

The earth around the oil field production equipment including wellheads, mud ponds, tubing stacks or any other place exposed to scaled equipment or the invasion of produced subsurface waters may be decontaminated by leaching the naturally occuring radioactive material (NORM) and scale from the earth and permitting the leachate to percolate into a secure, subterranean layer of the earth. Alternatively, the soil may be removed from around the equipment and the scale and NORM leached out in a tank. The leached soil can then be returned approximately to its former location, thereby avoiding the expense of removing the offending surface soil to a hazardous waste disposal site with the resultant transport and disposal expenses. In this case, the leachate may be recovered and treated by normal chemical methods if the radioactive material is wanted or, if not, the leachate may be returned to the subterranean formation from which the alkaline earth metal scale and NORM were derived. In this way, the contaminating material is returned to its original situs deep in the earth where it presents no danger.

THE DRAWINGS

The single FIGURE of the accompanying drawings shows, in simplified form, a section of the earth with oil field production equipment in place through various subterranean formations.

DETAILED DESCRIPTION

The surface earth formations which may be treated according to the present invention are usually those areas of the earth's surface and in the immediately adjacent subsurface layers which surround boreholes extending from the surface of the earth into subterranean formations where subsurface waters containing alkaline earth cations are found. Generally, boreholes of this type are used for the production of petroleum, natural gas and other minerals e.g. sulfur. During the drilling, completion or production phases of the life of the well, greater or lesser quantities of these subsurface waters may be brought to the surface of the earth where they will contaminate the equipment and the surface layers of the earth if they are not rigorously contained. Since the level of contamination is usually fairly small, rigorous containment has often not been applied in the past, but constant invasion of the surface layers by such waters may, over extended periods of time, result in an undesirable accumulation of NORM as well as the less harmful materials with similar chemistry. Accumulation of the NORM and scale may also occur around field equipment including tubing stacks or anywhere that scale equipment has been handled, particularly where scale has been removed using either known scale removal compositions or the highly effective scale removal compositions disclosed in the copending applications referred to above.

According to the present invention, the scale and NORM deposits are removed from the surface earth layers by leaching with a scale removal composition. The removal process may be carried out with the surface earth layer remaining undisturbed at its original situs or, alternatively, by removal of the earth to a tank or pond (with an impervious liner such as clay or plastic sheeting) in which the contaminants are removed using the aqueous composition. After the scale and NORM have been leached out from the earth, the decontaminated earth is brought back more or less to its original site and replaced. Methods for decontamination of surface earth layers in this manner are comparable to those which have been used for the removal of uranium from surface earth formations in areas of the Southwestern United States, including Texas and New Mexico.

If the contaminants are leached from the earth while it remains at its original situs, the character of the subsurface layers and formations should be ascertained in order to ensure that the leaching solution together with the leached-out contaminants does not enter any subsurface aquifers or other formations which should be maintained in a pristine condition. Thus, aquifers should be protected by an overlying impervious layer e.g. of clay or another impervious stratum. If this option is not, however, available, it may be necessary to resort to the earth removal technique referred to above, with the leachate solution containing the radioactive contaminants being treated separately to remove the contaminants e.g. by ion exhange over a cationic exchange resin or by disposal of the leachate solution in the original layer of the earth from which the contaminants were derived. This represents a preferred alternative since the offending materials are simply returned to their original place in the earth where they are largely innocuous.

The alkaline earth metal scales, especially barium and strontium sulfate scales and associated naturally occurring radioactive material (NORM) are removed from the earth around oil field production equipment using an aqueous scale removal composition which comprises a chelating agent or chelant in combination with a catalyst or synergist. Suitable aqueous solvents or compositions of this type are disclosed in related copending patent applications Ser. Nos. 07/332,146; 07/369/897; 07/431,114 and Ser. No. 07/484,970, to which reference is made for a description of suitable aqueous solvent compositions which may be used for the removal of alkaline earth sulfate scales and NORM from surface earth formations according to the methods disclosed in this present application. Any of the scale removal compositions disclosed in the related applications identified above, together with other suitable compositions having the same or similar effect may be used in the present techniques and will be more or less preferred according to their effectiveness. We prefer to use the oxalate containing compositions disclosed in Ser. No. 07/369,897 since these have been found to give fast rates of sulfate scale dissolution and are able to take up a high level of sulfate scale into solution so that they represent a particularly favored method of decontaminating surface earth formations. The monocarboxylic acid anion synergists disclosed in Ser. No. 07/431,114, especially the salicylate anion, have also been found to give good results, so that these too constitute a preferred class of synergists. The thiosulfate and nitriloacetate synergists disclosed in Ser. No. 07/484,970 are also capable of improving the dissolution of the scale relative to that of the chelant without the synergist.

The aqueous solvent composition which is used to remove the scale material from the earth comprises a polyaminopolycarboxylic acid such as ethylenediaminetetraacetic acid (EDTA) or diethylenetriaminepentaacetic acid (DTPA) as a chelant or chelating agent which is intended to form a stable complex with the cation of the alkaline earth scale-forming material. Of these chelants, DTPA is the preferred species since it forms the most soluble complexes at greatest reaction rate. EDTA may be used but is somewhat less favorable and, as noted below, may be less responsive to the addition of the catalyst or synergist. The chelant may be added to the solvent in the acid form or, alternatively, as a salt of the acid, preferably the potassium salt. In any event the alkaline conditions used in the scale removal process will convert the free acid to the salt.

The concentration of the chelant in the solvent should normally be at least 0.1M in order to achieve acceptable degree of scale removal. Chelant concentrations in excess of 1.0M are usually not necessary and concentrations from about 0.3M up to about 0.6M will normally give good results; although higher concentrations of chelant may be used, there is generally no advantage to doing so because the efficiency of the chelant utilisation will be lower at excess chelant concentrations. This economic penalty is particularly notable in oilfield operations where large volumes of solvent may be used, especially in formation scale removal treatment.

In addition to the chelant, the present scale removal compositions contain a catalyst or synergist for the dissolution of the scale. As described in the applications referred to above, the synergist is preferably the oxalate anion, a monocarboxylic anion such as mercaptoacetate, hydroxyacetate or aminoacetate or an aromatic acid, preferably salicylate, or thiosulfate or nitriloacetate. Generally these anions are added as salts or the free acid, depending on the stability and availability of the chosen synergist. In either case, however, the relatively alkaline conditions under which the process is operated, will result in the acid, if used, being converted to the salt form. The potassium salts are preferred in view of their greater solubility and for this reason, the solvent should preferably be brought to the desired pH value with a potassium base, preferably potassium hydroxide.

The concentration of the catalyst or synergist in the aqueous solvent will be of a similar order to that of the chelant: thus, the amount of the synergist anion in the solvent should normally be at least 0.1M in order to achieve a perceptible increase in the efficiency of the scale removal, and concentrations from about 0.3M up to about 0.6M will give good results. Although higher concentrations of the synergist e.g. above 1.0M may be used, there is generally no advantage to doing so because the efficiency of the process will be lower at excess catalyst concentrations. Again, this economic penalty is particularly notable in oilfield operations.

The scale removal is effected under alkaline conditions preferably at pH values of from about 8.0 to about 14.0, with optimum values being from about 11 to 13, preferably about 12. As noted above, the use of caustic potash is preferred to bring the composition to the desired pH since the potassium salts formed by its use are more soluble than the corresponding sodium salts.

The prefered solvents comprise about 0.1 to about 1.0M of ethylenediaminetetraacetic acid (EDTA) or diethylenetriaminepentaacetic acid (DTPA), or salts of these acids, as a chelant. In addition, the chosen anionic catalyst or synergist is added to the aqueous solution in about 0.01 to about 1.0, preferably about 0.1M to 0.5M, concentration. The pH of the solvent is then adjusted by the addition of a base, preferably potassium hydroxide, to the desired value, preferably to about pH 12. We have found that it is important to avoid the use of sodium cations when operating at high pH values, above pH 8, and instead, to use potassium or, alternatively, cesium as the cation of the scale-removing agent. Potassium is preferred for economy as well as availability. Thus, the normal course of making up the solvent will be to dissolve the chelant and the potassium salt of the selected synergist in the water to the desired concentration, after which a potassium base, usually potassium hydroxide is added to bring the pH to the desired value of about 12.

Prior to contact with the earth, the composition may be heated to a temperature between about 25° C. to about 100° C., in order to improve the extraction of the insoluble mineral salts, if it is readily feasible to do so. Operation in a tank or vessel may be preferred for this reason. If it is possible to control the contact time between the earth and the composition e.g. by operation in a tank, the composition is allowed to remain there for about ten minutes to about 7 hours; after remaining in contact with the equipment for the desired time, the composition containing the dissolved scale may be drained off from the earth and recovered for optional removal of the dissolved scale species.

The FIGURE shows a simplified section of the earth with an oil well extending down through the layers of the earth to a production interval from which the oil is produced. The well 10 extends through surface conductor pipe 11 and is cased through successive layers of the earth with casing of progressively decreasing diameter 12 to completion in production interval 13. The borehole extends through various subsurface strata $S_1$, $S_2$ and $S_3$, indicated conventionally in the FIGURE. During drilling and completion of the well, surface equipment such as drilling mast 14 with its associated equipment such as turntable, blowout preventer and pipe handling equipment, is situated on the surface of the earth with drill pipe and tubular goods are located conveniently for installation, for example, the pipe located in pipestack 15. If subsurface waters are brought to the surface through the well during drilling completion or production and are permitted to accumulate on the earth's surface, e.g. in an unlined mud pond, precipitates of the insoluble sulfate scale materials including radium may accumulate in the surface layer of the earth 16 around the well with the undesirable results referred to above.

The contaminants may be removed by first applying to the surface of the earth an aqueous chemical scale removal composition of the type referred to above in order to convert the insoluble alkaline earth metal sulfate precipitates to a form in which they are soluble in water. The solubilized precipitates are then leached from the surface layers of the earth using additional water which is permitted to percolate into a lower level where the presence of the removed metals may be tolerated. The chemical composition may be applied by means of sprayers or hoses or other suitable applicators; the water may be applied in a similar manner using the same equipment if the natural rainfall at the site is sporadic or sparse. The earth surrounding the wellhead may then be returned to productive use, including use for agriculture, without any potential harmful effect. As noted above, any aquifers should be protected by an overlying impervious layer in order to prevent contamination of the aquifer.

If the earth is decontaminated by the removal technique, the use of two separate treatment liqids, i.e. the solvent followed by water, is not necessary and it is possible to utilize one treatment only, using the aqueous, chemical solvent which converts the sulfate precipitates to soluble form and dissolves them in the solvent itself. In the in-situ method, the use of the additional water leach is preferred in order to ensure effective removal of the precipitates with the minimum amount of solvent.

We claim:

1. A method of decontaminating earth which has been contaminated with precipitates of alkaline earth metal sulfates, which method comprises (i) converting the precipitated alkaline earth metal sulfates in the earth to soluble form by contacting the sulfate precipitate with an aqueous composition comprising a chelating agent and a synergist (ii) leaching the dissolved alkaline earth precipitate from the earth with water.

2. A method according to claim 1 in which the earth layer is a surface earth layer contaminated with alkaline earth metal sulfate precipitate derived from a subsurface layer in the earth.

3. A method according to claim 1 in which the precipitates of alkaline earth metal sulfates include radium sulfate.

4. A method according to claim 1 in which the aqueous leachate is percolated into a lower layer of the earth.

5. A method according to claim 1 in which the contaminated earth is removed from its situs and leached in a separate location.

6. A method according to claim 5 in which the earth is leached in a tank or pond lined with an impervious lining.

7. A method according to claim 5 in which the earth is separated from the leachate and returned to the approximate site from which it was removed.

8. A method according to claim 1 in which the removal composition comprises polyaminopolycarboxylic acid as the chelating agent and oxalate anion as a synergist.

9. A method according to claim 1 in which the aqueous solution comprises a polyaminopolycarboxylic acid as the chelating agent and a monocarboxylic acid anion as the synergist.

10. A method according to claim 9 in which the monocarboxylic anion is selected from hydroxyacetate, mercaptoacetate and aminoacetate.

11. A method according to claim 9 in which the monocarboxylic acid anion comprises salicylate anion.

12. A method according to claim 1 in which the aqueous solution comprises polyaminopolycarboxylic acid as the chelating agent and a synergist selected from thiosulfate and nitriloacetate anions.

13. A method of decontaminating earth which has been contaminated with precipitates of alkaline earth metal sulfates, which method comprises (i) removing the contaminated earth to location away from its original site, (ii) contacting the contaminated earth containing the precipitated alkaline earth metal sulfates with an aqueous composition comprising a chelating agent and a synergist to convert the alkaline earth metal sulfates to water soluble form and leach the solubilized alkaline earth metal sulfates from the earth.

14. A method according to claim 13 in which the removal composition comprises polyaminopolycarboxylic acid as the chelating agent and oxalate anion as a synergist.

15. A method according to claim 13 in which the aqueous solution comprises a polyaminopolycarboxylic acid as the chelating agent and a monocarboxylic acid anion as the synergist.

16. A method according to claim 15 in which the monocarboxylic anion is selected from hydroxyacetate, mercaptoacetate and aminoacetate.

17. A method according to claim 15 in which the monocarboxylic acid anion comprises salicylate anion.

18. A method according to claim 13 in which the aqueous solution comprises polyaminopolycarboxylic acid as the chelating agent and a synergist selected from thiosulfate and nitriloacetate anions.

19. A method of decontaminating earth which has been contaminated with precipitates of alkaline earth metal sulfates, which method comprises (i) applying an aqueous solvent composition comprising a chelating agent and a synergist to the contaminated earth at its site to convert the precipitated alkaline earth metal sulfates in the earth to soluble form, (ii) applying water to the surface of the earth treated with the solvent composition to leach the dissolved alkaline earth precipitate from the earth.

20. A method according to claim 19 in which the dissolved alkaline earth metal sulfates are leached into a lower layer of the earth.

* * * * *